United States Patent [19]

Hiramatsu et al.

[11] Patent Number: 4,888,672
[45] Date of Patent: Dec. 19, 1989

[54] STARTING CIRCUIT OF SELF-EXCITED INVERTER

[75] Inventors: Rihei Hiramatsu, Tokyo; Seiji Imano, Inagi; Kazushi Watanabe, Nagaoka; Shinzo Takeishi, Kawasaki, all of Japan

[73] Assignees: Nemic Lambda Co., Ltd.; Densetsu Co., Ltd; Yutaka Electric Mfg. Co., Ltd., all of Japan

[21] Appl. No.: 288,793

[22] Filed: Nov. 18, 1988

[30] Foreign Application Priority Data

Aug. 31, 1988 [JP] Japan ............... 63-217385

[51] Int. Cl.⁴ .......................... H02M 3/335
[52] U.S. Cl. ........................ 363/49; 363/19
[58] Field of Search ............... 363/18–21, 363/49, 131, 97; 323/901

[56] References Cited

U.S. PATENT DOCUMENTS 3,697,851 10/1972 Mast ..................... 363/19
4,595,973 6/1986 Masuda et al. ............ 363/18
4,700,280 10/1987 Onda et al. ............... 363/19

FOREIGN PATENT DOCUMENTS 0072123 6/1978 Japan ..................... 363/19
0046772 3/1985 Japan ..................... 363/19

OTHER PUBLICATIONS

Kohno et al., "A Saturable Reactor Controlled Ringing Choke Converter", Intelec 79, Washington, D.C., U.S.A. (26–29 Nov. 79), pp. 265–271.

Primary Examiner—Peter S. Wong
Attorney, Agent, or Firm—Lowe, Price, Leblanc, Becker & Shur

[57] ABSTRACT

When the power source voltage is charged to a capacitor between the source side of a MOSFET and a saturation reactor at the time of starting, the gate voltage of the MOSFET is caused to rise. When this charging voltage or the gate voltage exceeds the threshold voltage, the MOSFET is energized. The energization of this MOSFET induces a voltage in the tertiary self-excited oscillation winding through the primary winding, and a part of the induced voltage is applied to the gate of the MOSFET while some other part is applied to the reactor. This causes the magnetic flux of the saturation reactor to be set to the direction opposite that which had been set before. When the product of the voltages applied to the saturation reactor has reached the level for the allowable saturation magnetic flux density the saturation reactor is saturated and the gate voltage is discharged to turn off the MOSFET. When the MOSFET is energized once, the setting and resetting of the saturation reactor is repeated alternately due to the actions of the primary winding and the tertiary self-excited winding to enter the state of stable operation.

3 Claims, 4 Drawing Sheets

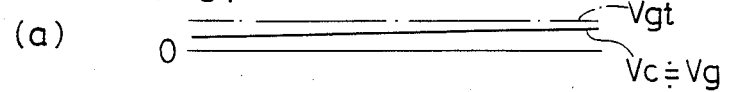
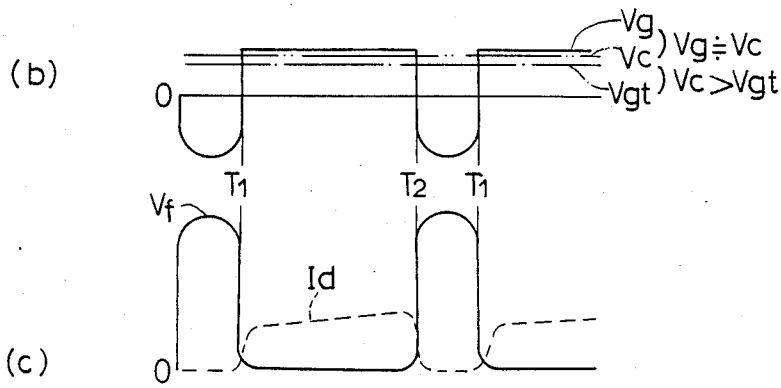
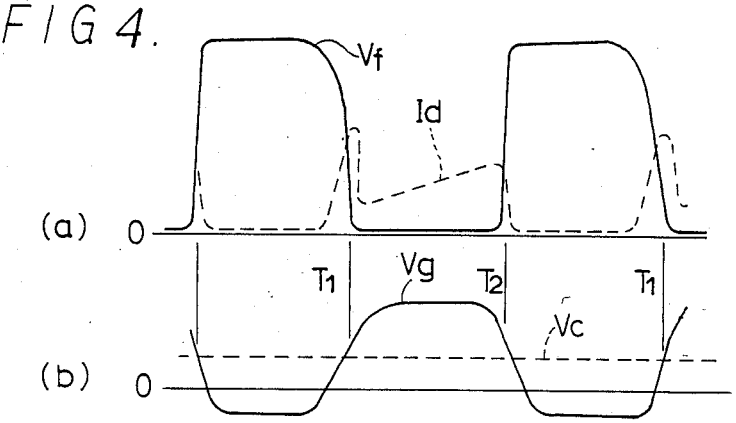
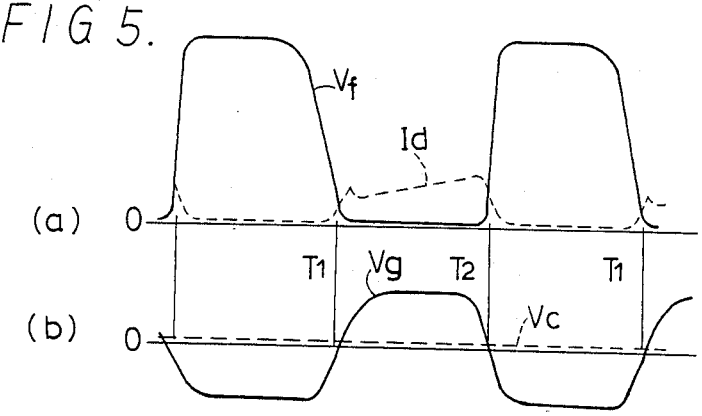

STARTING CIRCUIT OF SELF-EXCITED INVERTER

BACKGROUND OF THE INVENTION

The present invention relates to the starting circuit of a self-excited inverter at the input side of a high-frequency switching power source using a MOSFET as the switching element. Conventionally, in a self-excited inverter circuit as is shown in FIG. 6, a trigger diode 5 is inserted between the coupling point of resistor 2 and capacitor 3 which are connected between both ends of DC power source 1 and the gate of the MOSFET 4 so that the capacitor 3 is made to oscillate by repeating the charging and discharging alternately as illustrated in FIG. 7(a) to output the pulse voltage Vp as is illustrated in FIG. 7(b) at the time of the discharge of the charged voltage $Vc_2$ of capacitor 3, and this output is used to supply the gate voltage to the MOSFET 4 for starting; simultaneously with the start of the MOSFET 4, the charged voltage $Vc_2$ of the capacitor 3 is discharged through diode 6, resistor 7 and the MOSFET 4 to prevent unnecessary restarting.

In the above example, numeral 8 represents the main transformer, 9 the primary input winding, 10 the secondary output winding, 11 the tertiary self-excited oscillation winding, 12 the saturation reactor, 13 and 14 the resistors.

In attempting to start the MOSFET 4 in a manner described above, the magnetic flux of the saturation reactor 12 is always set to one direction as indicated by the dotted line in FIG. 6, and so the alternate repetition of setting and resetting cannot be accomplished adequately. Needless to say, when the operation is started once, the saturation reactor 12 repeats the cycle of setting and resetting, though the saturation reactor continues to be saturated only in one direction, and some device is required to maintain stable operation. As stated previously, starting the circuit with the pulse from the trigger diode 5 is one of the methods for realizing stable operation, but this method is known to have the following disadvantages.

The trigger diode which is essential in the conventional circuit has its inherent and vital disadvantages. Firstly, for instance, the discharging voltage of the trigger diode is about 30 to 35V, which is not applicable to the switching power source whose input power source voltage is 30V or less. Secondly, the manufacturers do not guarantee conformance to high industrial standards for communications equipment because of the construction of the trigger diode itself, and thus the manufacturers' guarantees are made conforming to their private standards. For example, the guaranteed operating temperature ranges from 0 to 85° C.

BRIEF SUMMARY OF THE INVENTION

An objective of the present invention is to provide a starting circuit for a self-excited inverter without the limitation of the minimum voltage of the power source, which can be realized depending on the number of the turns of the winding of the tertiary self-excited oscillation winding, and without requiring the use of the trigger diode.

Another object of the present invention is to provide a starting circuit for a self-excited inverter, all components of which are in conformity to the communication industry standard.

The self-excited inverter according to the present invention intended to accomplish the aforementioned objects comprises a main transformer containing a primary input winding, secondary output winding and tertiary self-excited oscillation winding, wherein said primary input winding and a switching element are connected in series to the input power source; said switching element is driven by the power from said tertiary winding through a serially connected appropriate impedance and a parallelly connected saturation reactor; said switching element consists of a MOSFET; a capacitor is inserted between the source side of said MOSFET and said reactor; and a resistor is inserted between the coupling point of the saturation reactor and the capacitor and said power source.

In such a combination, the power source voltage is charged to the capacitor when the inverter is excited, and this causes the rise of gate voltage of the MOSFET. Then, the capacitor continues to be charged continuously, and the MOSFET is energized when the gate voltage has exceeded the threshold voltage. More particularly, the power for the gate voltage is charged through the resistor and the saturation reactor, and the MOSFET starts to be energized when this gate voltage exceeds the threshold voltage. The energization of the MOSFET causes a voltage to be induced in the tertiary winding through the primary winding, and a part of this voltage is applied to the gate of the MOSFET while the other part to the saturation reactor. Then, the magnetic flux of the saturation reactor is caused to be set to the direction reverse to the direction reset before the excitation. When the product of the voltages applied to the saturation reactor has reached the level for allowable magnetic flux quantity, the saturation reactor is saturated, and the gate voltage is discharged to turn off the MOSFET. When the MOSFET is energized once, the setting and resetting of the saturation reactor is repeated alternately to enter stable operation.

DESCRIPTION OF THE DRAWING

FIGS. 3, 4 and 5 are the output waveforms of various parts of the circuits according to the present invention.

DETAILED DESCRIPTION

Figure 6:
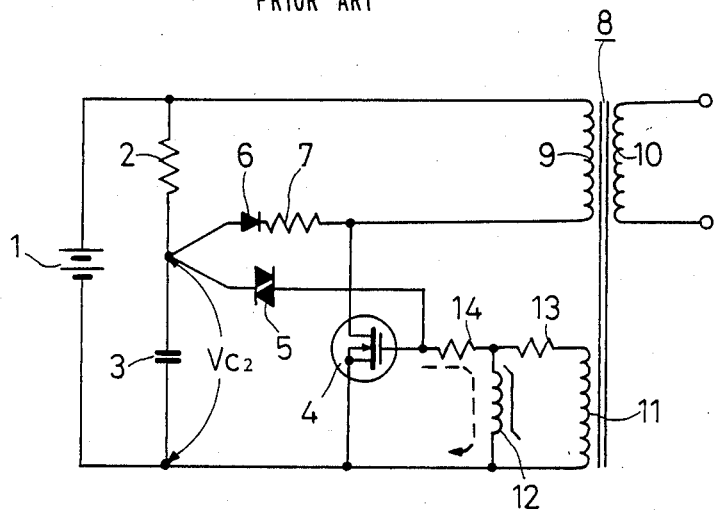
FIG. 6 is a circuit diagram of a conventional starting circuit for self-excited inverter.
Figure 7:
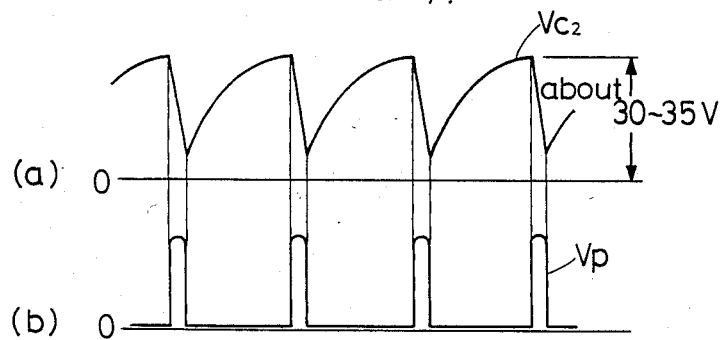
FIG. 7 shows the output waveforms of various parts of the conventional circuit.

The embodiments of the present invention will be explained below referring to the relevant drawings. Note, however, that, in FIG. 6, the same numerals as those used to denote the parts found in the conventional circuit are used to denote the parts found in the circuit according to the present invention where such parts are common to both.

Figure 1:
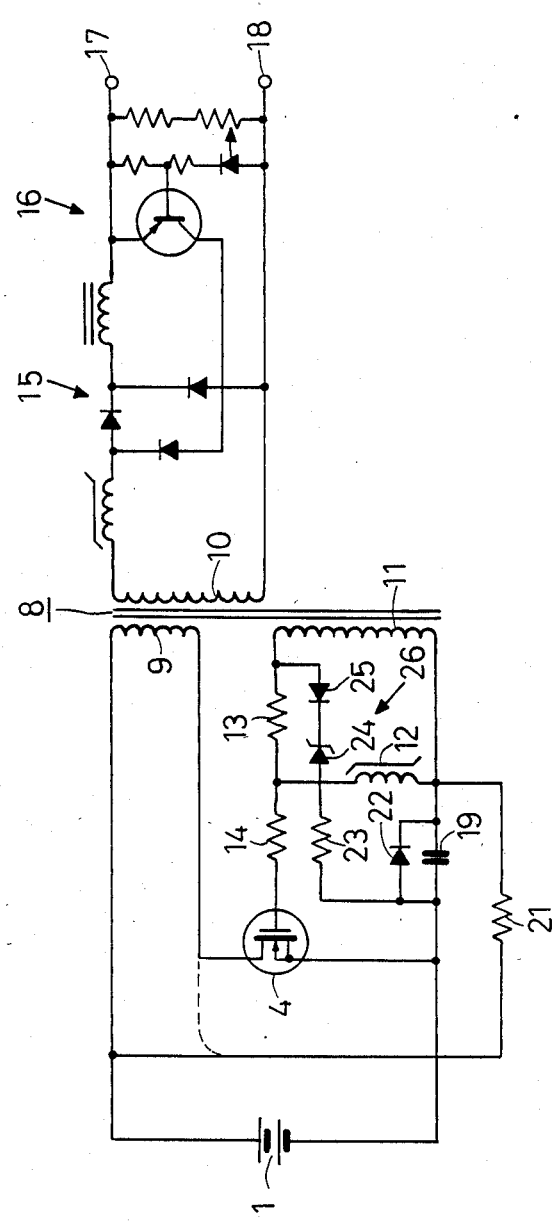
FIG. 1 is a circuit diagram showing the self-excited inverter excitation as the first embodiment of the present invention.

In FIG. 1, the numeral 8 denotes the main transformer. The main transformer 8 contains the primary input winding 9, the secondary output winding 10 and the tertiary self-excited oscillation winding 11. Said primary input winding 9 is serially connected to the DC power source 1 through MOSFET 4 as a switching element. Said secondary output winding is connected to output terminals 17 and 18 through a rectification and smoothing circuit 15 and an output voltage detection circuit 16. The positive terminal of said tertiary self excited oscillation winding 11 is connected to the gate side of said MOSFET 4 through resistors 13 and 14, while the negative side to the source side of said MOSFET 4 through capacitor 19. The resistor 21 is interposed between the positive side of said DC power source and the coupling point of said capacitor 19 and the saturation reactor 12. A diode 22 as a barrier layer voltage element is connected between the both ends of said capacitor 19. A drive circuit wherein a resistor 23, a Zener diode 24 and a diode 25 are connected in series is connected between the anode side of the diode 22 and the positive terminal side of said tertiary self-excited oscillation winding 11 so that, before the MOSFET 4 is actuated, the saturation reactor 12 maintains a positive voltage to the source side, whereas, after actuation, said positive voltage is cancelled.

Figure 2:
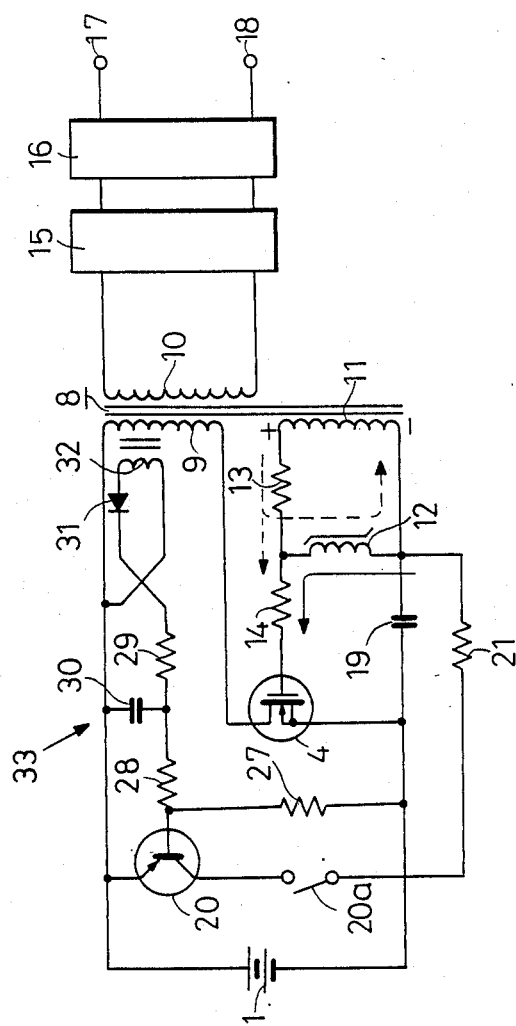
FIG. 2 is an electric circuit diagram concerning the second embodiment of the present invention.

FIG. 2 shows an example wherein a PNP transistor 20 as a switching element and a switch 20a are connected in series to said resistor 21. As for this transistor 20, its emitter is connected in series to the positive side of the power source 1; collector to the resistor 21 through the switch 20a; and the base to base resistor 27 and also to a switching control circuit 33 consisting of resistors 28 and 29, capacitor 30, diode 31 and the quartic winding 32 so that said transistor 20 can be controlled to close before starting and opened after starting.

The function of the circuit composed as described above will be explained below.

First, explanation will be made as to the forward type inverter circuit as is shown in FIG. 2.

When the input voltage Vi starts to be supplied to the inverter circuit while the switch 20a is closed, the base current is supplied to the transistor 20 through the emitter, base and base resistor 27 to cause the transistor 20 to be turned on, and the voltage Vc from the collector is supplied to the capacitor 19 through the resistor 21. In this case, due to the characteristic of the MOSFET, the impedance between the gate and the source of the MOSFET 4 is only the capacitance of $C_{iss}$, and so the gate voltage Vg rises as the capacitor 19 is charged. This state refers to that indicated in FIG. 3(a), wherein the gate voltage Vg is not actuated unless the voltage exceeds the threshold voltage Vgt. After the capacitor 19 continues to be charged to reach the state shown in FIG. 3(b), when the charged voltage Vc ($\approx$ gate voltage Vg) exceeds Vgt, the MOSFET 4 starts to be energized.

In this case, the fact that the gate voltage Vg is charged from the direction indicated with an arrow through the resistor 21 and the saturation reactor 12 is extremely important for the stabilization of the start according to the present invention. That is, as shown in FIG. 3(b), the MOSFET 4 starts to be energized when Vg$\geq$Vgt at the time $T_2$. When the MOSFET is energized once, the voltage is induced in the tertiary self-excited oscillation winding 11. A part of this voltage is applied to the gate of the MOSFET, and the other part to the saturation reactor 12 as indicated by an arrow of dotted line. Then, the magnetic flux lw of the saturation reactor which has been reset to the direction indicated by a solid line before starting is reversed to the direction for setting with the start of actuation. The saturation reactor saturates when the product of the voltage applied to the reactor and the time, that is, the allowable saturation magnetic flux quantity $\phi sc$ is reached, and the gate voltage Vg of MOSFET 4 is discharged to turn off the MOSFET 4, which corresponds to the time $T_2$ in FIG. 3(b) and (c).

Then, the function of the circuit according to the present invention comprising the transistor 20 inserted in parallel to the resistor 21, the switching control circuit 33 for controlling the transistor 20, and the barrier layer voltage element 22 and the arrive circuit 26 which are connected to both ends of the capacitor will be explained below.

In the case of a circuit where the transistor 20, switching control circuit 33, barrier layer voltage element 22 and drive circuit 26 are absent, the operation will be as shown in FIG. 4(a) and (b). That is, in the cases shown in FIG. 4(a) and (b), when the incoming of the current from the resistor 21 continues, the charging voltage Vc of the capacitor 19 remains constant at Vc, and this voltage Vc causes the gate voltage Vg to be shifted to positive side. Thus, the gate voltage Vg has an unnecessarily large value at the time of $T_2$ when the MOSFET 4 is energized, thereby causing the flow of a large drain current Id, which results in the loss of efficiency and the increase in noise. Thus, it is possible for the gate voltage Vg at the time of $T_2$ to be controlled effectively where the voltage Vc of the capacitor is held to zero, whereby the drain current Id can be controlled as shown in FIG. 5(a) for higher efficiency and lower noise. In order to attain aforesaid purposes, the transistor 20 as is shown in FIG. 2 is used to let the main transformer 8 apply an inverse bias voltage to the base and emitter of the transistor 20 through the switching control circuit 33 to shut off the circuit of resistor 21 when the normal operation is entered. Thus, the circuit comprising an additional transistor 20 inserted in series between the coupling point of the saturation reactor 12 and the capacitor 19 and the power source 1 to provide the switching circuit 33 wherein said transistor 20 is closed before starting and opened after starting is also effective in attaining the aforesaid purposes.

Furthermore, in the case shown in FIG. 1, when the operation is started once by the diode 25, Zener diode 24, resistor 23 and diode 22, the voltage induced in the tertiary self-excited oscillation winding 11 is utilized to let the current flow in the order of the positive side of the tertiary self-excited oscillation winding 11 diode 25 Zener diode 24 resistor 23 diode 22 negative side of the tertiary self-excited oscillation winding 11, whereby the voltage across the capacitor 19 is clamped by the drop of the voltage of the diode in normal direction, and the condition for keeping the voltage Vc of the capacitor held to zero can be satisfied without fail.

What is claimed is:

1. A starting circuit of a self-excited inverter comprising a main transformer having a primary input winding, secondary output winding and tertiary self-excited oscillation winding, wherein said primary input winding and a switching element are serially connected to a power source; said switching element is driven by said tertiary self-excited oscillation winding through an appropriate serially connected impedance and a parallelly connected saturation reactor; said switching element consists of a MOSFET; a capacitor is inserted between said MOSFET and said saturation reactor; and a resistor is interposed between the coupling point of said saturation reactor and the capacitor and said power source.

2. A starting circuit of a self-excited inverter defined in claim 1, wherein an additional switching element is serially connected to the resistor interposed between the coupling point of the saturation reactor and the capacitor and the power source so that an additional switching circuit is provided wherein said additional switching element is closed before starting and opened after starting.

3. A starting circuit of a self-excited inverter defined in claim 1, wherein at least one of an additional switching element and a barrier layer voltage element is connected in parallel to both ends of said capacitor inserted between the source of said MOSFET and said saturation reactor, and at least one of said additional switching element and said barrier layer voltage element constitutes an additional drive circuit to enable the saturation reactor to have a positive voltage at a source side thereof before starting and such positive voltage being cancelled after starting.

* * * * *